(12) United States Patent
Yang et al.

(10) Patent No.: US 10,788,189 B2
(45) Date of Patent: Sep. 29, 2020

(54) BACKLIGHT ILLUMINATING MODULE

(71) Applicant: Shenzhen Chenbei Technology Co., Ltd., Shenzhen (CN)

(72) Inventors: Lin Yang, Shenzhen (CN); Hai Yang, Shenzhen (CN)

(*) Notice: Subject to any disclaimer, the term of this patent is extended or adjusted under 35 U.S.C. 154(b) by 0 days.

(21) Appl. No.: 16/729,457

(22) Filed: Dec. 29, 2019

(65) Prior Publication Data

US 2020/0208803 A1 Jul. 2, 2020

(30) Foreign Application Priority Data

Dec. 29, 2018 (CN) .......................... 2018 1 1643313

(51) Int. Cl.
| | |
|---|---|
| *F21V 21/00* | (2006.01) |
| *F21V 7/00* | (2006.01) |
| *F21V 5/02* | (2006.01) |
| *G02B 5/02* | (2006.01) |
| *G02B 5/04* | (2006.01) |
| *G06F 1/16* | (2006.01) |

(52) U.S. Cl.
CPC .............. *F21V 7/0008* (2013.01); *F21V 5/02* (2013.01); *G02B 5/0252* (2013.01); *G02B 5/045* (2013.01); *G06F 1/1609* (2013.01)

(58) Field of Classification Search
CPC ......... F21V 7/008; F21V 5/02; G02B 5/0252; G02B 5/045; G06F 1/1609
USPC ............ 362/249.02, 249.04, 249.08, 217.05, 362/217.14, 243, 285, 296.1, 297, 301, 362/302, 311.02
See application file for complete search history.

(56) References Cited

U.S. PATENT DOCUMENTS

| | | | | |
|---|---|---|---|---|
| 5,642,933 | A * | 7/1997 | Hitora .................... | F21S 8/083 362/243 |
| 6,814,475 | B2 * | 11/2004 | Amano ................... | F21S 43/14 362/487 |
| 7,198,384 | B2 * | 4/2007 | Kakiuchi ................ | G02B 1/00 362/293 |
| 8,920,001 | B2 * | 12/2014 | Park ........................ | F21V 7/26 362/307 |
| 2013/0258652 | A1 * | 10/2013 | Hsieh ...................... | F21V 13/10 362/225 |
| 2014/0085874 | A1 * | 3/2014 | Kawagoe ................ | F21S 8/04 362/147 |
| 2014/0355243 | A1 * | 12/2014 | Yu ........................... | F21K 9/68 362/84 |

* cited by examiner

*Primary Examiner* — Laura K Tso
(74) *Attorney, Agent, or Firm* — Tsz Lung Yeung

(57) ABSTRACT

A backlight illuminating module includes a first supporting base, a plurality of first illuminating units, and a light reflection housing. The light reflection housing includes a first light reflection member having a first inclined reflection surface, a first vertical optical surface and a plurality of first prisms provided in a first light reflection chamber, wherein when the first illuminating units are activated to generate illumination, the illumination is arranged to be reflected and diffracted by the first inclined reflection surface, the first vertical optical surface and the first prisms to produce an uniform line source of light of the backlight illuminating module.

17 Claims, 6 Drawing Sheets

BACKLIGHT ILLUMINATING MODULE

BACKGROUND OF THE PRESENT INVENTION

Field of Invention

The present invention relates to a backlight illuminating module, and more particularly to a backlight illuminating module comprising a light reflection housing which is capable of producing soft, even and uniform line source of light for electrical and electronic devices.

Description of Related Arts

Conventionally, many electrical household appliances and electronic devices require backlight illumination for users of such devices to use them in the dark or in dim light environments. In additional, backlight illumination can also be used for creating special light effects.

In backlighting technology, the surface brightness of the product should be as uniform as possible. If the light source which provides the backlight illumination is positioned far away from the light-emitting surface of the product, this requirement can be achieved by using a plurality of a lens and a diffusers.

However, the trend is that ultra-thin devices are becoming more popular. This means that the light source of the backlight illumination must be positioned very close to the light-emitting surface. However, it is rather difficult to achieve high-quality illumination by conventional backlighting methods such as through lenses and astigmatism technology. Uneven brightness, with the presence of visible bright spots, throughout the light-emitting screen may be present. This is not satisfactory because uneven brightness may severely affect the overall aesthetic effect of the electronic product and may cause excessive fatigue on users' eyes.

As a result, there is a need to develop a backlight illuminating module comprising which is capable of producing soft, even and uniform line source of light for electrical and electronic devices.

SUMMARY OF THE PRESENT INVENTION

Certain variations of the present invention provide a backlight illuminating module comprising a light reflection housing which is capable of producing soft, even and uniform line source of light for electrical and electronic devices.

In one aspect of the present invention, it provides a backlight illuminating module, comprising:

a first supporting base having a first inner mounting surface, the first supporting base being configured from light admissible material;

a plurality of first illuminating units spacedly mounted on the first inner mounting surface of the first supporting base; and a light reflection housing, which comprises:

a first light reflection member having a first inclined reflection surface and a first vertical optical surface extended from the first inclined reflection surface, the first light reflection member connecting to the first supporting base to form a first light reflection chamber as a space formed between the first inclined reflection surface, the first vertical optical surface and the first inner mounting surface, the first light reflection member being configured from light admissible material; and a plurality of first prisms provided in the first light reflection chamber, wherein when the first illuminating units are activated to generate illumination, the illumination is arranged to be reflected and diffracted by the first inclined reflection surface, the first vertical optical surface and the first prisms to produce an uniform line source of light of the backlight illuminating module.

This summary presented above is provided merely to introduce certain concepts and not to identify any key or essential features of the claimed subject matter.

DETAILED DESCRIPTION OF THE PREFERRED EMBODIMENT

Figure 1:
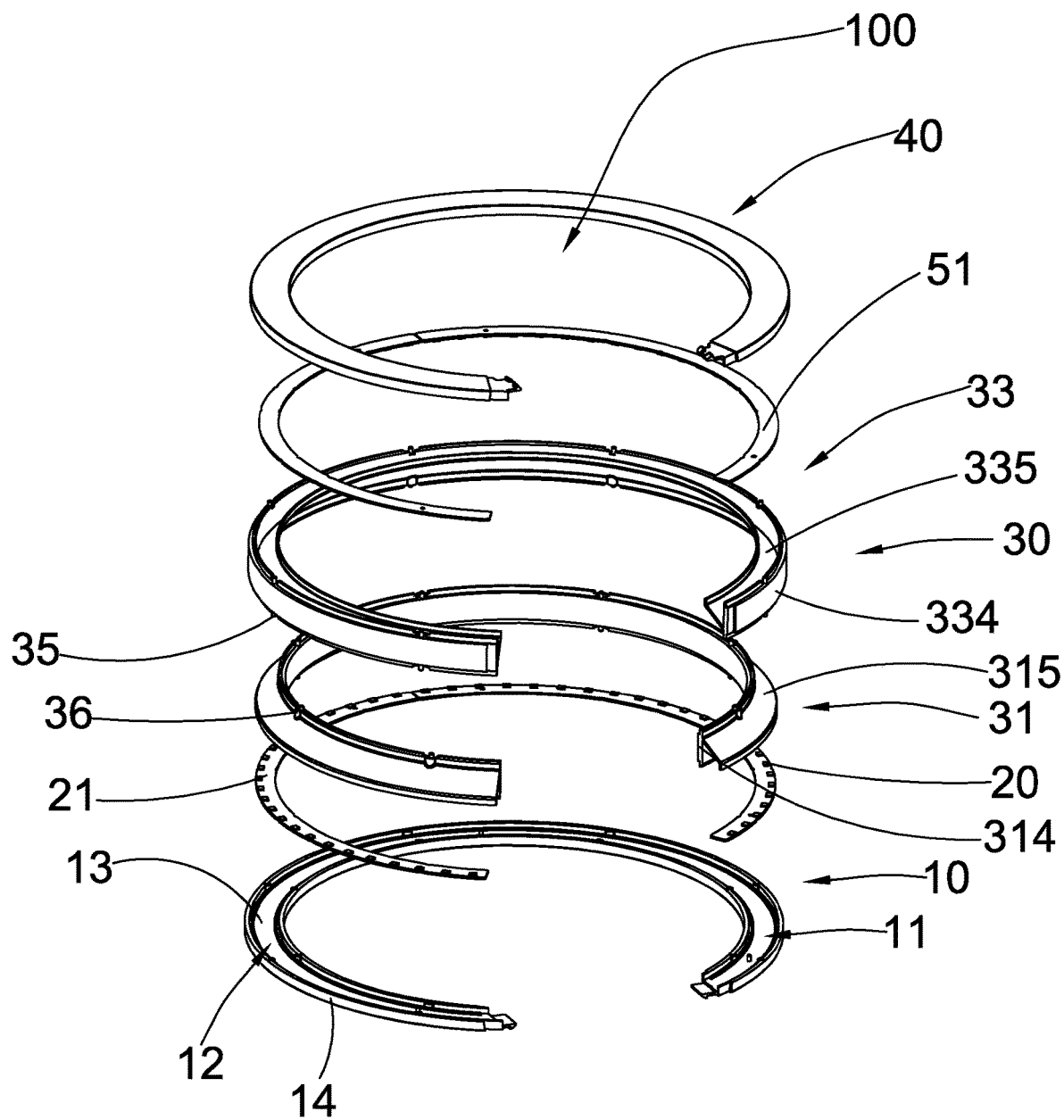
FIG. 1 is an exploded perspective view of a backlight illuminating module according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 6 of the drawings, a backlight illuminating module for an electrical appliance or an electronic device according to a preferred embodiment of the present invention is illustrated. Broadly, the backlight illuminating module may comprise a first supporting base 10, a plurality of first illuminating units 20, and a light reflection housing 30. The backlight illuminating module may be used for providing background illumination for a display or light-emitting module of the electrical appliance or the electronic device.

The first supporting base 10 may have a first inner mounting surface 11. The first supporting base 10 may be configured from a predetermined light admissible material, such as plastic.

The plurality of first illuminating units 20 may be spacedly mounted on the first inner mounting surface 11 of the first supporting base 10.

The light reflection housing 30 may comprise a first light reflection member 31 and a plurality of first prisms 32. The first light reflection member 31 may have a first inclined reflection surface 311 and a first vertical optical surface 312 extended from the first inclined reflection surface 311. The first light reflection member 31 may connect to the first supporting base 10 to form a first light reflection chamber 313 as a space formed between the first inclined reflection surface 311, the first vertical optical surface 312 and the first inner mounting surface 11. The first light reflection member 31 may also be configured from a predetermined light admissible material, such as plastic.

The plurality of first prisms 32 may be provided in the first light reflection chamber 313, wherein when the first illuminating units 20 are activated to generate illumination, the illumination is arranged to be reflected and diffracted by the first inclined reflection surface 311, the first vertical optical surface 312 and the first prisms 32 to produce a uniform line source of light of the light reflection housing 30.

According to the preferred embodiment of the present invention, the backlight illuminating module may further comprise a second supporting base 40 which may have a second inner mounting surface 41. The second supporting base 40 may be configured from a predetermined light admissible material, such as plastic.

Moreover, the backlight illuminating module may further comprise a plurality of second illuminating units 50 spacedly mounted on the second inner mounting surface 41 of the second supporting base 40.

The light reflection housing 30 may further comprise a second light reflection member 33 and a plurality of second prisms 34. The second light reflection member 33 may have a second inclined reflection surface 331 and a second vertical optical surface 332 extended from the second inclined reflection surface 331. The second light reflection member 33 may connect to the second supporting base 40 to form a second light reflection chamber 333 as a space formed between the second inclined reflection surface 331, the second vertical optical surface 332 and the second inner mounting surface 41. The second light reflection member 33 may also be configured from a predetermined light admissible material, such as plastic.

The plurality of second prisms 34 may be provided in the second light reflection chamber 333, wherein when the second illuminating units 50 are activated to generate illumination, the illumination thus generated is arranged to be reflected and diffracted by the second inclined reflection surface 331, the second vertical optical surface 332 and the second prisms 34 to produce a uniform line source of light of the light reflection housing 30.

In other words, the light reflection housing 30 may be sandwiched between the first supporting base 10 and the second supporting base 40. The first supporting base 10 and the second supporting base 40 may be provided on two opposite sides of the light reflection housing 30 respectively, as shown in FIG. 1 and FIG. 2 of the drawings.

According to the preferred embodiment of the present invention, each of the first supporting base 10, the second supporting base 40 and the light reflection housing 30 may have an annular structure having a through central opening 100 when viewed from the top.

Referring to FIG. 1 of the drawings, the first supporting base 10 may have a first indented channel 12 extended along an entire length of the first supporting base 10, wherein the first inner mounting surface 11 may be formed as a lower boundary of the first indented channel 12. Thus, the first supporting base 10 may comprise a first outer wall 13 and a plurality of first sidewalls 14 extended from the first outer wall 13 for forming the first indented channel 12 as a space surrounded by the first outer wall 13 and the first sidewalls 14. The first illuminating units 20 may be mounted on the first inner mounting surface 11 and within the first indented channel 12.

Figure 2:
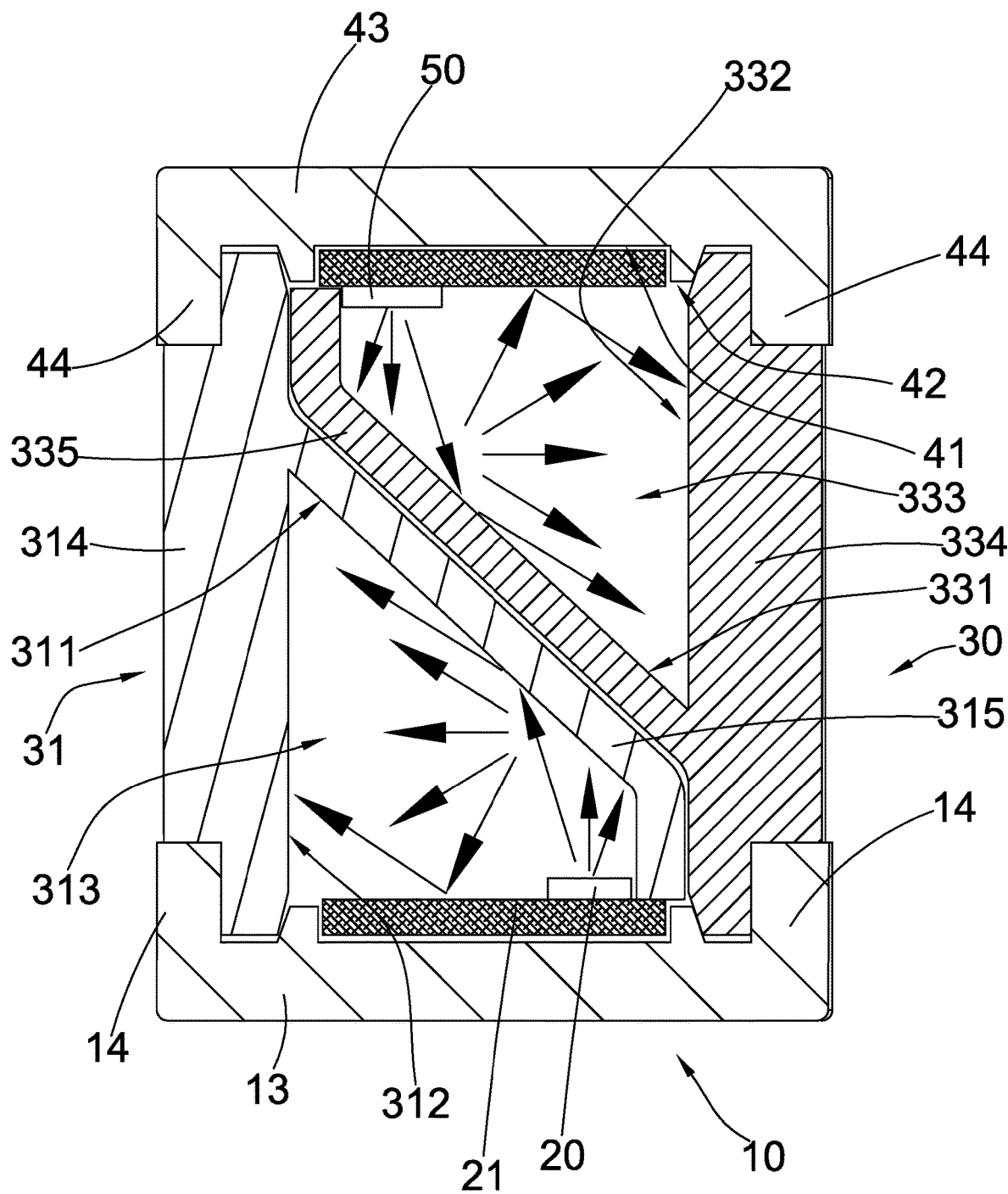
FIG. 2 is a sectional side view of the backlight illuminating module according to the preferred embodiment of the present invention.
Figure 3:
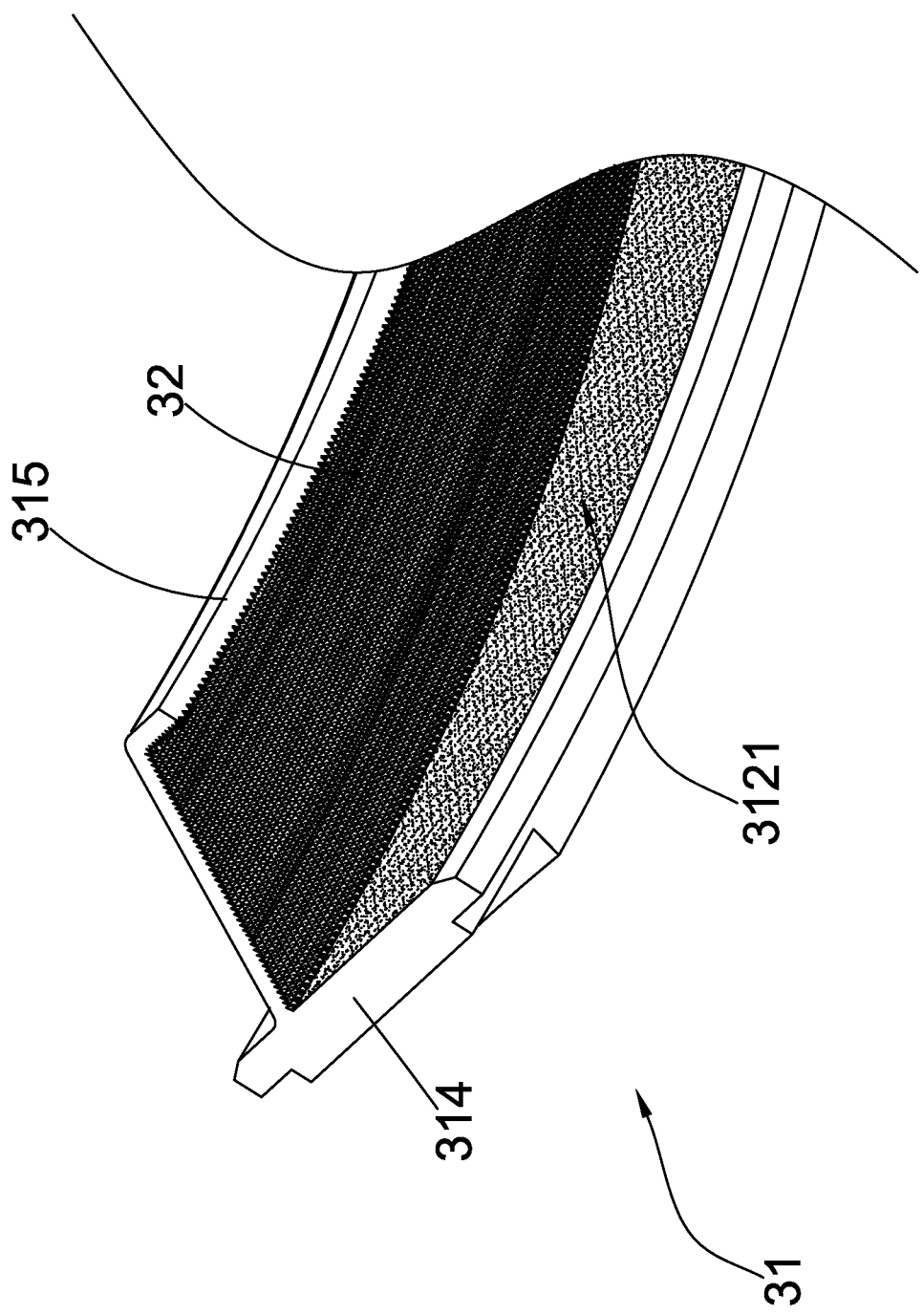
FIG. 3 is a schematic diagram of a first light reflection member of the backlight illuminating module according to the preferred embodiment of the present invention.
Figure 4:
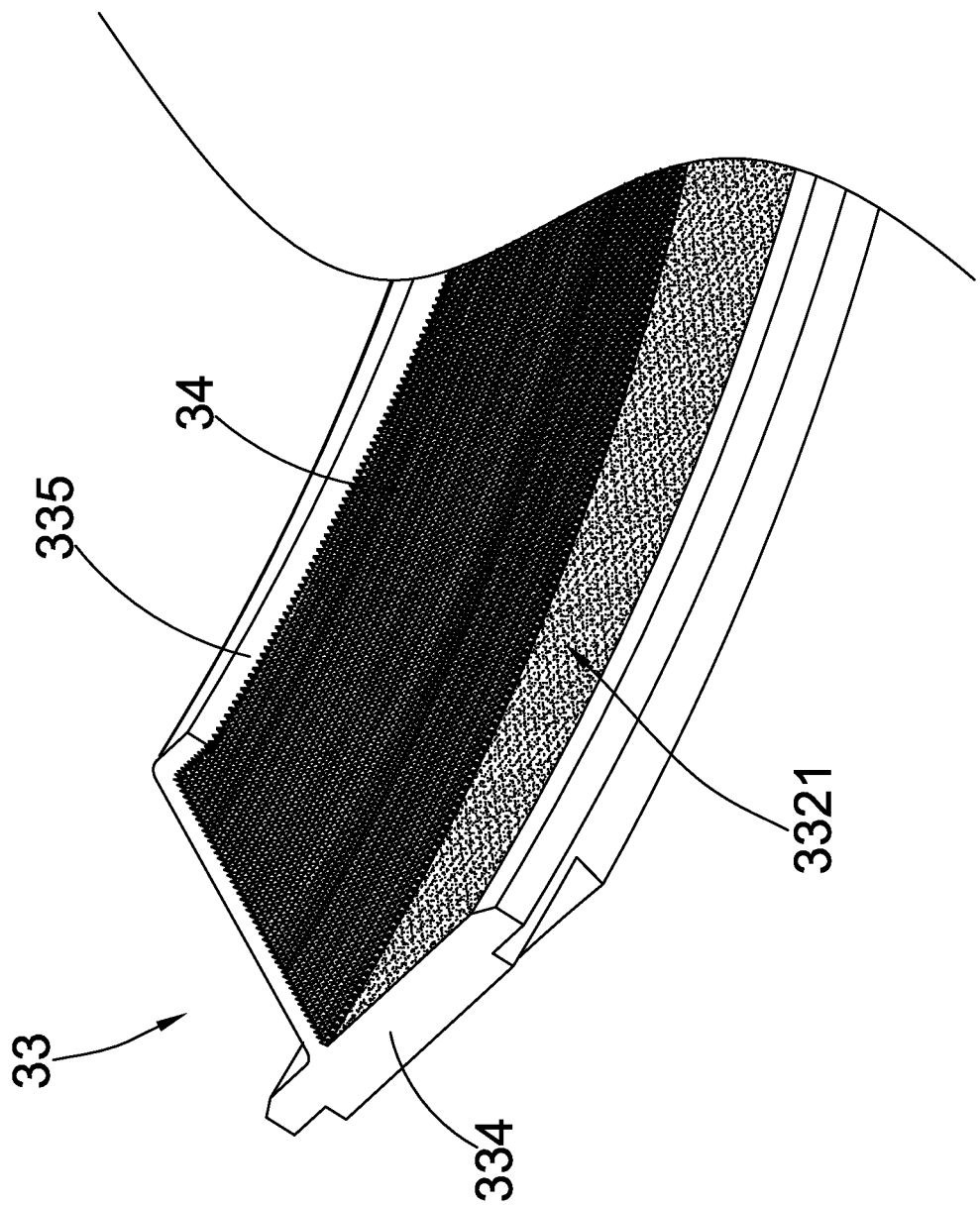
FIG. 4 is a schematic diagram of a second light reflection member of the backlight illuminating module according to the preferred embodiment of the present invention.

As shown in FIG. 2 to FIG. 3 of the drawings, the first light reflection member 31 may comprise a first vertical wall 314 and a first inclined wall 315 wherein the first inclined reflection surface 311 and the first vertical optical surface 312 may be formed as an inner surface of the first vertical wall 314 and the first inclined wall 315 respectively. The first vertical optical surface 312 of the first light reflection member 31 may be configured to have a first light diverting pattern 3121 such that when illumination generated by the first illuminating units 20 impinges on the first vertical optical surface 312, the illumination may be evenly reflected in multiple directions in the first light reflection chamber 313. The first light diverting pattern 3121 may form as an uneven surface contour on the first vertical optical surface 312 so as to facilitate multiple reflection of the illumination generated by the first illuminating units 20. The first vertical wall 314 may be configured from light-admissible material.

The first illuminating units 20 may be evenly implemented or mounted on a first Printed Circuit Board (first PCB 21) which is shaped and sized to correspond to that of the first indented channel 12. Thus, when the first illuminating units 20 are mounted in the first indented channel 12, the first illuminating units 20 may provide a line source of continuous light which resembles the contour of the first supporting base 10. By reflecting the illumination to multiple directions in the first light reflection chamber 313, the illumination in the first light reflection chamber 313 will thus be softened and be made more even.

Figure 5:
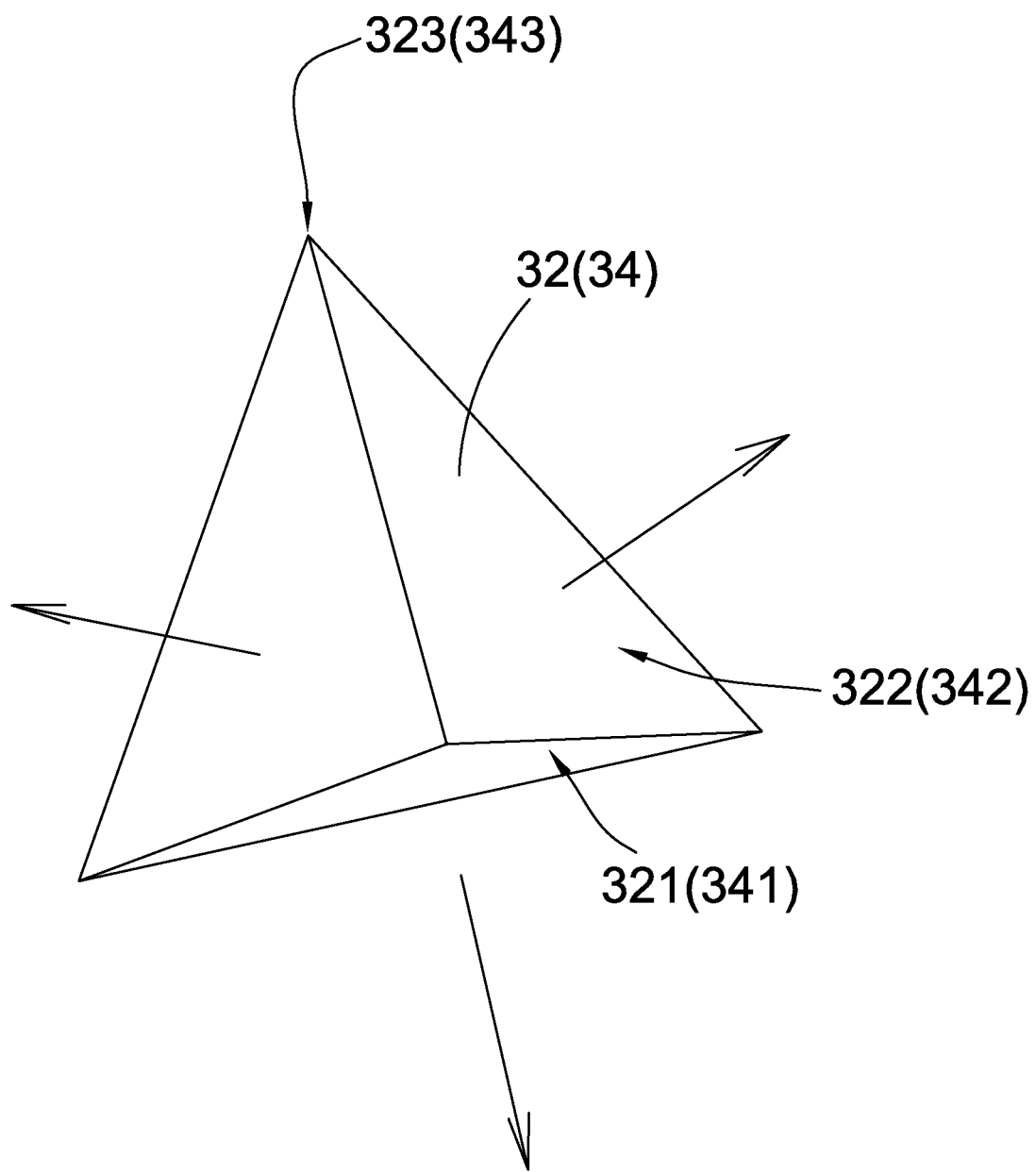
FIG. 5 is a schematic diagram of a first (second) prism of the backlight illuminating module according to the preferred embodiment of the present invention.

The first prisms 32 may be distributed along the first inclined reflection surface 311 for further reflecting and refracting the light propagating in the first light reflection chamber 313. As shown in FIG. 5 of the drawings, each of the first prisms 32 may have a first base surface 321 and a plurality of first inclined optical surfaces 322 peripherally extended from the first base surface 321 to form a first prism tip 323 as intersection of the first inclined optical surfaces 322. Each of the first prisms 32 may be transparent and allow light to pass through or refracted.

Figure 6:
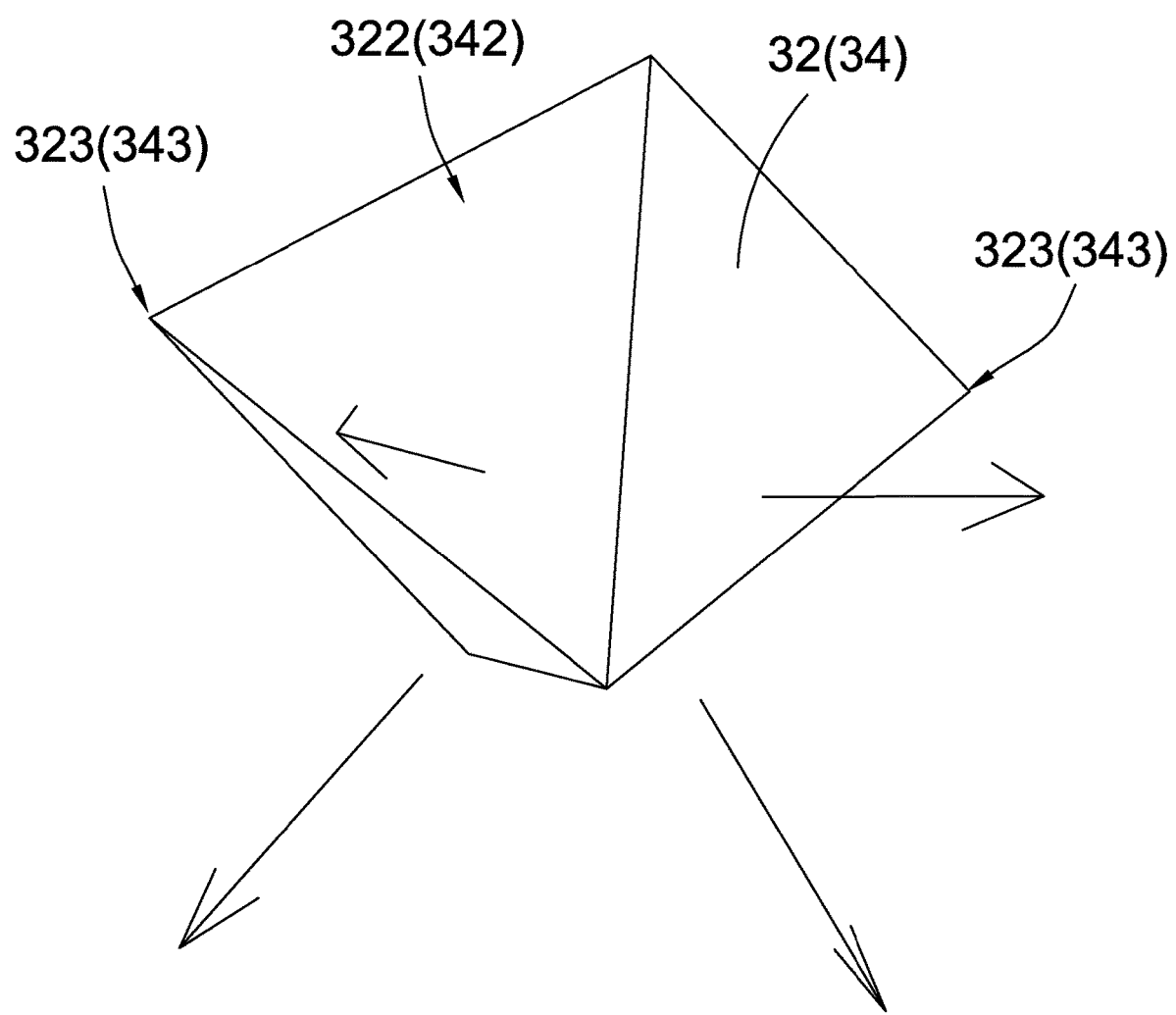
FIG. 6 is an alternative diagram of the first (second) prism of the backlight illuminating module according to the preferred embodiment of the present invention.

It is worth mentioning that the structure of the first prisms 32 may take a wide variety of alternatives. For example, as shown in FIG. 5 of the drawings, one first prism 32 may be configured to have three first inclined optical surfaces 322 so as to form a pyramid structure. As another example, as shown in FIG. 6 of the drawings, one first prism 32 may be configured to have four first inclined optical surfaces 322 and form two first prism tips 323. The number of first inclined optical surfaces 322 may be varied so as to meet different manufacturing and design requirements of the electronic or electrical devices in which the present invention is utilized.

According to the preferred embodiment of the present invention, the first prisms 32 may be distributed along the first inclined wall 315 for reflecting and diffracting the illumination generated by the first illuminating units 20.

On the other hand, the second supporting base 40 may have a second indented channel 42 extended along an entire length of the second supporting base 40, wherein the second inner mounting surface 40 may be formed as a side boundary of the second indented channel 42. Thus, the second supporting base 40 may comprise a second outer wall 43 and a plurality of second sidewalls 44 extended from the second outer wall 43 for forming the second indented channel 42 as a space surrounded by the second outer wall 43 and the second sidewalls 44. The second illuminating units 50 may be mounted on the second inner mounting surface 41 and within the second indented channel 42.

As shown in FIG. 1 to FIG. 2 of the drawings, the second light reflection member 33 may comprise a second vertical wall 334 and a second inclined wall 335 wherein the second inclined reflection surface 331 and the second vertical optical surface 332 may be formed as an inner surface of the second vertical wall 334 and the second inclined wall 335 respectively. The second vertical optical surface 332 of the second light reflection member 33 may be configured to have a second light diverting pattern 3321 such that when illumination generated by the second illuminating units 50 impinges on the second vertical optical surface 332, the illumination may be evenly reflected in multiple directions in the second light reflection chamber 333. The second light diverting pattern 3321 may form as an uneven surface contour on the second vertical optical surface 332 so as to facilitate multiple reflection of the illumination generated by the second illuminating units 50.

The second illuminating units 50 may be evenly implemented or mounted on a second Printed Circuit Board (second PCB 51) which is shaped and sized to correspond to that of the second indented channel 42. Thus, when the second illuminating units 50 are mounted in the second indented channel 42, the second illuminating units 50 may provide a line source of continuous light which resembles the contour of the second supporting base 40. By reflecting the illumination to multiple directions in the second light reflection chamber 333, the illumination in the second light reflection chamber 333 will thus be softened and be made more even.

The second prisms 34 may be distributed along the second inclined reflection surface 331 for further reflecting and refracting the light propagating in the second light reflection chamber 333. Each of the second prisms 34 may have a second base surface 341 and a plurality of second inclined optical surfaces 342 peripherally extended from the second base surface 341 to form a second prism tip 343 as intersection of the second inclined optical surfaces 342. Each of the second prisms 34 may be transparent and allow light to pass through or refracted.

Again, the structure of the second prisms 34 may take a wide variety of alternatives. For example, as shown in FIG. 5 of the drawings, one second prism 34 may be configured to have three second inclined optical surfaces 342 so as to form a pyramid structure. As another example, as shown in FIG. 6 of the drawings, one second prism 34 may be configured to have four second inclined optical surfaces 342. The number of second inclined optical surfaces 342 may be varied so as to meet different manufacturing and design requirements of the electronic or electrical devices in which the present invention is utilized. This is the same as the first prisms 32. Each of the second prisms 34 may be structurally identical to each of the first prisms 32.

According to the preferred embodiment of the present invention, the second prisms 34 may be distributed along the second inclined wall 335 for reflecting and diffracting the illumination generated by the second illuminating units 50.

As shown in FIG. 1 of the drawings, the first light reflection member 31 and the second light reflection member 33 may be mounted in a back-to-back manner through a plurality of connectors 35 mounting on a plurality of mounting columns 36 provided on the first light reflection member 31 and the second light reflection member 33.

Each of the first supporting base 10 and the second supporting base 40 may further comprise a light inadmissible layer provided in the first indented channel 12 and the second indented channel 42 for preventing leakage of light from the first supporting base 10 and the second supporting base 40.

Each of the first PCB 21 and the second PCB 51 may be equipped with light reflection member which allow even reflection of light in the first supporting base 10 and the second supporting base 20 respectively.

The first light reflection member 31 and the second light reflection member 33 may be configured from partially transparent material for enhancing light reflection performance in the light reflection housing 30.

Moreover, the light reflection housing 30 may comprise a plurality of backlight layers provided on the first base surfaces 321 of the first prisms 32 and the second base surfaces 341 of the second prisms 34 respectively for preventing undesirable leakage of light.

The present invention, while illustrated and described in terms of a preferred embodiment and several alternatives, is not limited to the particular description contained in this specification. Additional alternative or equivalent components could also be used to practice the present invention.

What is claimed is:

1. A backlight illuminating module, comprising:
   a first supporting base having a first inner mounting surface;
   a plurality of first illuminating units spacedly mounted on said first inner mounting surface of said first supporting base; and
   a light reflection housing, which comprises:
   a first light reflection member having a first inclined reflection surface and a first vertical optical surface extended from said first inclined reflection surface, said first light reflection member connecting to said first supporting base to form a first light reflection chamber as a space formed between said first inclined reflection surface, said first vertical optical surface and said first inner mounting surface; and
   a plurality of first prisms provided in said first light reflection chamber, wherein when said first illuminating units are activated to generate illumination, said illumination is arranged to be reflected and diffracted by said first inclined reflection surface, said first vertical optical surface and said first prisms to produce an uniform line source of light of said backlight illuminating module.

2. The backlight illuminating module, as recited in claim 1, further comprising a second supporting base having a second inner mounting surface, and a plurality of second illuminating units spacedly mounted on said second inner mounting surface, said second supporting base being mounted on said light reflection housing opposite to aid first supporting base so that said light reflection housing is sandwiched between said first supporting base and said second supporting base.

3. The backlight illuminating module, as recited in claim 2, wherein said light reflection housing further comprising a second light reflection member and a plurality of second prisms, said second light reflection member having a second inclined reflection surface and a second vertical optical surface extended from said second inclined reflection surface, said second light reflection member connecting to said second supporting base to form a second light reflection chamber as a space formed between said second inclined reflection surface, said second vertical optical surface and said second inner mounting surface.

4. The backlight illuminating module, as recited in claim 3, wherein said plurality of second prisms is provided in said second light reflection chamber, wherein when said second illuminating units are activated to generate illumination, said illumination thus generated is arranged to be reflected and diffracted by said second inclined reflection surface, said second vertical optical surface and said second prisms to produce a uniform line source of light of said light reflection housing.

5. The backlight illuminating module, as recited in claim 4, wherein each of said first supporting base, said second supporting base and said light reflection housing has an annular structure having a through central opening.

6. The backlight illuminating module, as recited in claim 1, wherein said first supporting base has a first indented channel extended along an entire length of said first supporting base, wherein said first inner mounting surface is formed as a boundary of said first indented channel, said first illuminating units being mounted on said first inner mounting surface and in said first indented channel.

7. The backlight illuminating module, as recited in claim 5, wherein said first supporting base has a first indented channel extended along an entire length of said first supporting base, wherein said first inner mounting surface is formed as a boundary of said first indented channel, said first illuminating units being mounted on said first inner mounting surface and in said first indented channel.

8. The backlight illuminating module, as recited in claim 6, wherein said first vertical optical surface of said first light reflection member has a first light diverting pattern formed thereon such that when illumination generated by said first illuminating units impinges on said first vertical optical surface, said illumination is evenly reflected in multiple directions in said first light reflection chamber.

9. The backlight illuminating module, as recited in claim 7, wherein said first vertical optical surface of said first light reflection member has a first light diverting pattern formed thereon such that when illumination generated by said first illuminating units impinges on said first vertical optical surface, said illumination is evenly reflected in multiple directions in said first light reflection chamber.

10. The backlight illuminating module, as recited in claim 8, wherein said first prisms are distributed along said first inclined reflection surface for further reflecting and refracting said light propagating in said first light reflection chamber, at least one of said first prisms having a first base surface and a plurality of first inclined optical surfaces peripherally extended from said first base surface to form a first prism tip as intersection of said first inclined optical surfaces.

11. The backlight illuminating module, as recited in claim 9, wherein said first prisms are distributed along said first inclined reflection surface for further reflecting and refracting said light propagating in said first light reflection chamber, at least one of said first prisms having a first base surface and a plurality of first inclined optical surfaces peripherally extended from said first base surface to form a first prism tip as intersection of said first inclined optical surfaces.

12. The backlight illuminating module, as recited in claim 10, wherein said wherein said first prisms are distributed along said first inclined reflection surface for further reflecting and refracting said light propagating in said first light reflection chamber, at least one of said first prisms has a first base surface and eight first inclined optical surfaces peripherally extended from said first base surface to form two first prism tips.

13. The backlight illuminating module, as recited in claim 11, wherein said wherein said first prisms are distributed along said first inclined reflection surface for further reflecting and refracting said light propagating in said first light reflection chamber, at least one of said first prisms has a first base surface and eight first inclined optical surfaces peripherally extended from said first base surface to form two first prism tips.

14. The backlight illuminating module, as recited in claim 13, wherein said second supporting base has a second indented channel extended along an entire length thereof, wherein said second inner mounting surface is formed as a boundary of said second indented channel, said second illuminating units being mounted on said second inner mounting surface and within said second indented channel.

15. The backlight illuminating module, as recited in claim 14, wherein said second vertical optical surface of said second light reflection member has a second light diverting pattern formed thereon such that when illumination generated by said second illuminating units impinges on said second vertical optical surface, said illumination is evenly reflected in multiple directions in said second light reflection chamber.

16. The backlight illuminating module, as recited in claim 15, wherein said second prisms are distributed along said second inclined reflection surface for further reflecting and refracting said light propagating in said second light reflection chamber, at least one of said second prisms having a second base surface and a plurality of second inclined optical surfaces peripherally extended from said second base surface to form a second prism tip as intersection of said second inclined optical surfaces.

17. The backlight illuminating module, as recited in claim 16, wherein said wherein said second prisms are distributed along said second inclined reflection surface for further reflecting and refracting said light propagating in said second light reflection chamber, at least one of said second prisms has a second base surface and eight second inclined optical surfaces peripherally extended from said second base surface to form two second prism tips.

\* \* \* \* \*